United States Patent
Wolff et al.

(10) Patent No.: US 7,208,431 B2
(45) Date of Patent: Apr. 24, 2007

(54) GLASS WITH NOTICEABLY IMPROVED STABILITY TO RADIATION DAMAGING, A PROCESS FOR ITS PRODUCTION AS WELL AS ITS USE

(75) Inventors: Silke Wolff, Hueckeswagen (DE); Ute Woelfel, Mainz-Laubenheim (DE)

(73) Assignee: Schott AG, Mainz (DE)

( * ) Notice: Subject to any disclaimer, the term of this patent is extended or adjusted under 35 U.S.C. 154(b) by 83 days.

(21) Appl. No.: 11/030,332

(22) Filed: Jan. 7, 2005

(65) Prior Publication Data

US 2005/0176574 A1  Aug. 11, 2005

(30) Foreign Application Priority Data

Jan. 8, 2004  (DE)  ................ 10 2004 001 458

(51) Int. Cl.
*C03C 3/07* (2006.01)
(52) U.S. Cl. ................ 501/74; 65/134.1; 65/134.3
(58) Field of Classification Search ........ 501/60–62, 501/74–76, 22, 23; 65/134.1, 134.3
See application file for complete search history.

(56) References Cited

U.S. PATENT DOCUMENTS

| 6,468,935 B1 | 10/2002 | Mori et al. |
| 2003/0064879 A1 | 4/2003 | Ogino et al. |

FOREIGN PATENT DOCUMENTS

| DE | 2603450 A1 | 9/1976 |
| DE | 19631171 A1 | 2/1997 |
| DE | 10207732 A1 | 9/2003 |
| EP | 1178019 A | 2/2002 |
| EP | 1262462 A | 12/2002 |
| JP | 58 088139 A | 5/1983 |
| JP | 60 210544 A | 10/1985 |
| JP | 2000159542 A | 6/2000 |

OTHER PUBLICATIONS

Patent Abstracts of Japan; vol. 007, No. 185 (C-181), Aug. 13, 1983.
Patent Abstracts of Japan; vol. 2000, No. 9, Oct. 13, 2000.
Patent Abstracts of Japan, vol. 010, No. 071 (C-334) Mar. 20, 1986.

*Primary Examiner*—Karl Group
(74) *Attorney, Agent, or Firm*—Millen, White, Zelano & Branigan, P.C.

(57) ABSTRACT

A glass with high internal transmission as well as low tendency to radiation-caused physical compaction and low tendency to solarization, comprising
  18 to 31% by weight of $SiO_2$,
  0 to 7% by weight of $Na_2O_3$,
  0 to 7% by weight of $K_2O$,
  65 to 84% by weight of PbO,
  0.001 to 1% by weight of $As_2O_3+As_2O_5$,
which is characterized by a content of
  0 to 5000 ppm of $Sb_2O_3$
  0 to 500 ppm of $TiO_2$
  0 to 100 ppm of CuO
  0 to 1000 ppm of F.

The $\Sigma(As_2O_3, As_2O_5, Sb_2O_3, F) \geq 20$ ppm and the ratio of As(III)/As(V) is at least 0.5. Such a glass is suitable for the use as optical element.

20 Claims, No Drawings

GLASS WITH NOTICEABLY IMPROVED STABILITY TO RADIATION DAMAGING, A PROCESS FOR ITS PRODUCTION AS WELL AS ITS USE

FIELD OF THE INVENTION

The invention relates to a glass, in particular a heavy flint glass with high internal transmission and high stability to radiation damage, i.e. low tendency to physical compaction and solarization, as well as its use in imaging and projection as well as the optical communications engineering and telecommunications and computer manufacturing.

BACKGROUND OF THE INVENTION

For modern optical high-performance facilities the requirements in relation to the imaging accuracy and resolution become higher and higher. This means on the one hand that larger and larger imaging respectively projection areas are attained; however on the other hand that the structures to be imaged have to be imaged more and more in smaller dimensions and in higher point and detail accuracy. Because of this reason it is necessary to expose with smaller and smaller wavelengths, i.e. with light having higher energy, which increases the energetic load of the optical elements. Moreover for a variety of technical applications, such as for example for micro lithography, for increasing the production rate shorter and shorter exposure times are demanded by which the radiant power respectively the radiation density which is directed through the optical facility, i.e. radiation exposure per time, has to rise involuntarily. Moreover for optical systems, in particular in communications engineering and telecommunications, a high luminous efficiency, i.e. a high transmission, is an important aim.

This means not only high requirements for the development of the respective optical facilities, but also for the material used for the optical facility which normally is a glass. Thus e.g. it is known that the use of high energy densities leads to a phenomenon which is called solarization by which the transmission, i.e. the radiolucency of an optical element, decreases drastically. However not only the total luminous efficiency of an optical element is reduced with that, but increasing amounts of energy are introduced into the matrix of the optical element by the radiation absorbed in this connection. Such a deposition of energy into the matrix additionally leads to compaction, i.e. a densification of the optical material. This densification causes shrinkage of the material matrix which also leads to a change of the optical properties, in particular the refraction power. But such changes of the refraction power result in a change of the radiation path which originally was calculated for the optical element by which the structure to be imaged will become blurred, i.e. the imaging accuracy will be lowered.

This effect is also enhanced, because such compactions are in a proportional ratio to the radiation and to the deposited energy, respectively, and each single component as well as also local areas inside these elements of an optical system are subjected to a different radiation exposure. Because of that in an optical system a geometrically irregular distortion takes place which adds in the total lenses. Thus during usage these effects lead to a strong decrease of the attainable point resolution as well as the image sharpness.

Since due to improved techniques such systems have a longer operating life today, also an increased radiation time of the optical elements occurs by which their energetic load increases and their time of application and hence their amortization and their viable use, respectively, will be limited which again leads to higher costs.

PRIOR ART

It has already been tried to improve the optical quality, i.e. the radiolucency, of such glass materials. So for example in DE 973 350 is described an optical silicate glass with a refractive index which is low in relation to the mean scatter respectively the v value. With it the glasses should have high dispersion. Such glasses which are for negative lenses contain 5 to 30% by weight of alkali metal oxides, 30 to 70% by weight of $SiO_2$ and $B_2O_3$ as well as 0.15 to 35% by weight of fluorine, wherein up to 5% by weight alkaline-earth metal oxides and at least one of the following substances $AlO_3$, $TiO_2$, $Sb_2O_3$, $As_2O_3$ and PbO have to be contained. The respective contents of $Al_2O_3$ and $TiO_2$ have to be lower or equal to 30% by weight, that of PbO has to be lower or equal to 55% by weight, that of $Sb_2O_3$ has to be lower or equal to 35% by weight and that of $As_2O_3$ has to be lower or equal to 5% by weight. If with it a v value of higher than 63.5 has to be attained the content of $Al_2O_3+Sb_2O_3+As_2O_3$ has to be higher than the content of $B_2O_3$. According to the teaching of DE 973 350 the low refraction power is achieved substantially by the addition of a great amount of fluoride which should substitute the oxygen in the glass structure.

In DE-A 26 03 450 optical lead silicate glasses with high transmittance in the visible range are described. Also according this reference the good optical properties are achieved by an addition of a high amount of fluoride with which introduced impurities which reduce the light transmission are masked.

According to the application with the official file reference 102 07 732.0 lead glasses are proposed which have improved properties regarding to optical and physical stability, in particular to solarization and compaction, and which have a good internal transmission. These lead glasses have a much lower refraction power and therewith a significantly lower sensitivity to radiation than high-leaded glasses, such as e.g. glasses of the series heavy flint (SF (German: 'Schwerflint') glasses).

SF glasses are characterized by high contents of lead oxide and additional contents of alkali metal oxides. One advantage of SF glasses is associated with their high refraction power and allows the achievement of shorter focal lengths in the field of the optical design by which thus smaller assembly part sizes may be realized. Additionally high-leaded glasses have a very low stress-optical coefficient which makes them particularly suitable for applications in the field of digital projection which work by means of a polarization controlled colourmanagement system and/or reflective LCDs. But the high proportion of lead of the SF glasses again leads to an increased sensitivity to radiation by direct absorption of energy.

SUMMARY OF THE INVENTION

Therefore a need exists for improved lead glasses, in particular for high-leaded glasses such as lead flint glasses or heavy flint glasses, which on the one hand have high refraction power and with it on the other hand are less sensitive to radiation and therewith are stable. According to the invention such improved glasses with high refraction power are provided which are characterized by good stability and low sensitivity to radiation. This object will be attained by the features which are defined in the claims.

It was found that for a lead glass, in particular for a lead flint glass or heavy flint glass, the object of the invention will be achieved by a high-leaded glass, in particular by a glass which contains 18 to 31% by weight of $SiO_2$, 0 to 7% by weight of $Na_2O$, 0 to 7% by weight of $K_2O$, 65 to 84% by weight of PbO as well as 0.001 to 1% by weight of $As_2O_3$, in which glasses in the melt respectively in the finished glass As(III) and As(V) are in a ratio of at least 0.5.

For the sake of this invention the term "high-leaded glass" means that at least 65% by weight of PbO are present in the final glass composition, in particular between 65% by weight and 84% by weight.

To achieve the above mentioned ration of As(III) and As(V), e.g. a Sb, Ti, Cu and/or fluoride source and/or a carbonaceous reducing agent can be added to the glass or to the starting materials thereof, respectively, optionally during the melting process. The content of $Sb_2O_3$ should not exceed 5000 ppm, the content of $TiO_2$ should be lower or equal to 500 ppm, that of CuO should be lower or equal to 100 ppm, that of carbonaceous reducing agents should be lower or equal to 5000 ppm and that of fluorine should be lower or equal to 1000 ppm. According to the invention still further the substances mentioned above have to satisfy the following condition:

$$\Sigma(As_2O_3, Sb_2O_3, F) \geq 20 \text{ ppm} \qquad \qquad I$$

and preferably $$\Sigma(Sb_2O_3 + 5*F + \text{carbonaceous reducing agent} + 50*CuO + 10*TiO_2) \geq 50 \text{ ppm}. \qquad II$$

Oxidizing melts normally show an increased proportion of As(V), wherein the ratio of As(III) and As(V) is approximately 0.4. On the contrary, usually not oxidizing melts, i.e. without oxygen supply, show a ratio of 0.45. Through the addition of reducing agents said ratio for the glass compositions of the invention may be adjusted to 0.5 without any problem, wherein the adjustment directly depends on the amount and the effectiveness of the respective reducing agent, respectively, which e.g. is reflected in sum formula II. Preferable ratios are at least 0.55, in particular at least 0.60, with at least 0.65 and in particular at least 0.70 are most preferable. Practical values are approximately 0.75.

Namely, according to the invention it was found that by taking into account the above adjustment rules, optical glasses may be obtained which do not only have excellent properties in relation to optical and physical stability, in particular to solarization and compaction, but which show also an excellent internal transmission.

The second sum formula II reflects that in the mixture according to the invention the single components show different efficiency factors with respect to the attainment of the objectives.

According to that, copper oxide has, for example, a 50 fold higher activity than sugar and/or antimony oxide. Fluorine has a 5 fold higher activity and titan oxide has a 10 fold higher activity. For the above formula it has still further to be taken into account that die fluorine concentration refers to the pure fluoride ion. According to the sum formula above this means that e.g. in a melt 2 grams of fluoride may be substituted for 10 grams of $Sb_2O_3$. Accordingly, 10 grams of titan oxide substitute one gram of carbonaceous reducing agent or $Sb_2O_3$. According to the invention thus it is possible to renounce high proportions of fluoride and to provide glasses with low proportions of fluoride or with no fluoride at all. According to the invention a content of $SiO_2$ of 19 to 30% by weight is preferable. A preferable range of sodium oxide is 0 to 5% by weight and a preferable range of $K_2O$ is 0 to 5% by weight. Preferable ranges of PbO are 66 to 83% by weight. The content of $Sb_2O_3$ is preferably 0 to 3000 ppm, that of $TiO_2$ is 0 to 200 ppm and that of CuO is 0 to 100 ppm.

With it the minimum content of the refining agents of the first sum formula I, i.e. $\Sigma(As_2O_3, Sb_2O_3, F)$, preferably is at least 50 ppm. The maximum content is preferably not higher than 25000 ppm, wherein 20000 ppm and in particular 15000 ppm are preferable. Particularly preferable is an upper limit of the elements of sum formula I of 7000 ppm. A particularly preferable minimum concentration is 100 ppm, wherein at least 200 ppm is even more particularly preferable.

The elements of sum formula II preferably are present in a concentration of at least 100 ppm, in particular 200 ppm, wherein 300 ppm is particularly preferable. Preferable upper limits for this are 20000 ppm, wherein a maximum of 15000 ppm and a maximum of 10000 ppm are particularly preferable.

According to the invention an addition of at least 10 ppm of arsenic oxide has demonstrated a particular suitability. Namely it was shown that thus even better transmission values may be obtained. With it arsenic oxide is preferably used as $As_2O_3$ in the presence of an additive which oxidizes arsenic, such as e.g. sodium nitrite, which during melting converts arsenic(III) into the refining arsenic(V) oxide. A preferable upper limit of $Sb_2O_3$ is 1200 ppm, in particular 1000 ppm. In many cases an upper limit of 500 ppm is suitable, wherein a maximum of 400 ppm and in particular of 300 ppm of $Sb_2O_3$ are particularly preferable. In an even more particularly preferable embodiment the glass according to the invention does not contain any $Sb_2O_3$.

According to the invention the upper limit of $TiO_2$ is 500 ppm, wherein 400 ppm and in particular 300 ppm are preferable. Even more particularly preferable is a maximum content of 200 ppm, in particular a maximum content of 100 ppm of $TiO_2$.

The glass according to the invention contains a maximum of 100 ppm of CuO, wherein a maximum of 80 ppm and a maximum of 50 ppm are preferable. Even more preferred are upper limits of a maximum of 20 ppm and in particular of a maximum of 10 ppm.

Namely according to the invention it was found that the tendency to solarization may be reduced in a superior manner by the additional addition of the mentioned doping agents which are summarized in sum formula II, wherein the prefix numbers are factors representing the effectiveness of the doping agents used according to the invention.

According to the invention fluorine is suitably added as fluoride, wherein as a cation normally (but not necessarily) a cation which is already present in the melt is used. Preferable fluorides are NaF, LiF, KF, $CaF_2$, $MgF_2$ as well as optionally also $Na_2SiF_6$.

For heavy flint glasses which are preferable according to the invention the amount of $SiO_2$ is 21 to 28% by weight, in particular 22 to 27% by weight, the amount of $Na_2O$ is 0 to 3% by weight, preferably 0.1 to 2% by weight, the amount of $K_2O$ is 0 to 3% by weight, in particular 0.1 to 2% by weight and the amount of PbO is 68 to 81% by weight, in particular 71 to 78% by weight. Furthermore there are: 0 to 3000 ppm of $Sb_2O_3$, 0 to 200 ppm of $TiO_2$, 0 to 100 ppm of CuO, 0 to 500 ppm of sugar and 0 to 1000 ppm of F. Here the amount of refining agents according to formula I is $\geq 50$ ppm and the amount of doping agents according to formula II is at least 1000 ppm.

In the glass according to the invention as carbonaceous reducing agents graphite respectively coal (also in the form of tubs, internals of tubs, crucibles, sticks, electrodes, stirrers or parts thereof), hydrocarbons, fatty acids, dicarboxylic acids such as e.g. oxalic acid, as well as in particular sugars may be used.

For the glass according to the invention any sugar may be used as well as other organic substances, in particular nitrogen and sulphur-free organic substances, in particular polyhydroxy compounds. Particularly preferable sugars are mono, di and/or polysaccharides, in particular such ones having the stoichiometric formula $C_6H_{12}O_6$. In a particular embodiment the glass of the invention is produced under a protective atmosphere, preferably under nitrogen.

The glasses according to the invention may optionally contain also small amounts of oxides of Fe, Cr, Co, Ni, Mn, Ag and/or V, singly or as any combination—preferably and independently from each other in an amount of $\leq 1000$ ppm each.

With the adjustment rules according to the invention it is possible to produce lead silicate glasses, in particular heavy flint glasses, which are low-melting. Additionally the glasses are workable in an easy manner and they have a refraction power of higher than 1.8, in particular of 1.8 to 1.9. The Abbe numbers of the glasses are in the range of 20 and 30.

The invention also relates to a procedure for the production of the glass according to the invention. With it the corresponding starting materials as oxides and/or salts, as normally used for the production of glass, together with the other glass adjuvants, in particular with those of sum formulae I and II, are melted and refined in a known manner and under cooling the desired glass is obtained which will be further processed to the optical elements. With it normally the adjuvants of the sum formulae are already added to the starting material prior to the melt.

The optical glasses according to the invention are particularly suitable for the production of optical devices, in particular objectives, light conductors and optical fibres as well as for imaging and projection, for micro lithography and also for the telecommunications and the optical communications engineering, as well as the digital projection.

Therefore they are particularly suitable for the production of lenses, prisms, fibre-optic rods, fibre-optic cables, optical windows, as well as optical components for photolithography, steppers, excimer lasers, wafers, computer chips, as well as integrated circuits and electronic apparatuses which contain such circuits and chips. The glasses according to the invention are particularly suitable for applications in the field of digital projection which work by means of a polarization controlled colourmanagement system and/or reflective LCDs. With the following example the invention is explained in more detail.

DETAILED DESCRIPTION OF CERTAIN EMBODIMENTS OF THE INVENTION

For it correspondingly the obtained substances were weighed as carbonates and/or nitrates, the doping agents and the base refining agent were added and thereafter the mixture was mixed thoroughly. Thereafter the glass mixture was molten into a continuous molten aggregate at a temperature of about 1250° C. and thereafter it was refined and homogenized at a temperature of 1320° C. Subsequently the glass was processed by pressing or rolling at a casting temperature of 1300° C., cooled in a defined manner and processed to the desired dimensions. The following table is a melt example for 100 kg of calculated glass which is the basis for the tables 2 and 3.

TABLE 1

Melt example for 100 kg of calculated glass.

| Oxide | % by weight | Raw material | Weighed portion (kg) |
|---|---|---|---|
| $SiO_2$ | 24.4 | $SiO_2$ | 24.401 |
| $Na_2O$ | 0.4 | $Na_2CO_3$ | 0.683 |
| $K_2O$ | 0.6 | $K_2CO_3$ | 0.880 |
| PbO | 74.3 | $Pb_3O_4$ | 75.974 |
| $As_2O_3$ | 0.3 | $As_2O_3$ | 0.300 |
| Sum | 100.0 | | 102.238 |

TABLE 2

Embodiments of the present invention (values in % by weight)

| | Glasses | | | | | |
|---|---|---|---|---|---|---|
| | Base glass | 1 | 2* | 3 | 4 | 5 |
| $SiO_2$ | 24.40 | 24.40 | 24.40 | 24.40 | 24.40 | 24.40 |
| $Na_2O$ | 0.40 | 0.40 | 0.40 | 0.40 | 0.40 | 0.40 |
| $K_2O$ | 0.60 | 0.60 | 0.60 | 0.60 | 0.60 | 0.60 |
| PbO | 74.30 | 74.30 | 74.30 | 74.30 | 74.30 | 74.30 |
| $As_2O_3$ | 0.30 | 0.30 | | 0.15 | 0.30 | 0.30 |
| $Sb_2O_3$ | | | 0.30 | 0.15 | | |
| CuO | | | | | 50 ppm | 10 ppm |
| $C_6H_{12}O_6$ | | 0.1 | | | | |
| $n_i$ | | | | | 1.9339 | |
| $n_g$ | 1.8937 | 1.8934 | 1.8957 | 1.8946 | 1.8794 | 1.8936 |
| $n_d$ | 1.8460 | 1.8460 | 1.8480 | 1.8471 | 1.8463 | 1.8462 |
| $v_d$ | 23.79 | 23.79 | 23.69 | 23.73 | 23.76 | 23.76 |
| $\tau i_{(25\ mm/420\ nm)}$ [%] | 34.7 | 30.0 | 0.4 | 3.7 | 16.3 | 20.4 |
| $\tau i_{(25\ mm/400\ nm)}$ [%] | 10.9 | 8.2 | | | 1.5 | 3.5 |
| $\tau i_{(25\ mm/380\ nm)}$ [%] | 0.9 | 0.5 | | | | 0.1 |
| Solarization | 9.5 | 8.1 | 10.1 | 8.0 | 3.6 | 5.3 |

TABLE 2-continued

Embodiments of the present invention (values in % by weight)

| | Base glass | 1 | 2* | 3 | 4 | 5 |
|---|---|---|---|---|---|---|
| Diff ($\Delta\tau i$) 100 mm/280–500 nm/15 h | | | | | | |
| Compaction | no | no | no | no | no | no |

*Glass 2 is not in the scope of the invention because no arsenic is used. Hence, the solarization is markedly higher (i.e. not desired) as compared to the glasses of the present invention.

TABLE 3

Embodiments of the present invention (values in % by weight)

| | Base glass | 6 | 7 | 8 |
|---|---|---|---|---|
| $SiO_2$ | 24.40 | 24.40 | 24.40 | 24.40 |
| $Na_2O$ | 0.40 | 0.40 | 0.40 | 0.40 |
| $K_2O$ | 0.60 | 0.60 | 0.60 | 0.60 |
| PbO | 74.30 | 74.30 | 74.30 | 74.30 |
| $As_2O_3$ | 0.30 | 0.30 | 0.30 | 0.15 |
| $TiO_2$ | | | | 10 ppm |
| F | | 0.05 | 0.10 | |
| $n_g$ | 1.8937 | 1.8930 | 1.8917 | 1.8940 |
| $n_d$ | 1.8460 | 1.8458 | 1.8447 | 1.8461 |
| $v_d$ | 23.79 | 23.81 | 23.89 | 23.78 |
| $\tau i$ (25 mm/420 nm) [%] | 34.7 | 27.9 | 23.8 | 1.3 |
| $\tau i$ (25 mm/400 nm) [%] | 10.9 | 7.0 | 5.1 | |
| $\tau i$ (25 mm/380 nm) [%] | 0.9 | 0.4 | 0.3 | |
| Solarization Diff ($\Delta\tau i$) 100 mm/280–500 nm/15 h | 9.5 | 6.8 | 8.3 | 8.0 |
| Compaction | no | no | no | no |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure of all applications, patents and publications, cited herein and of corresponding German application No. 102004001458.2, filed Jan. 8, 2004 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A high-leaded glass with a low tendency to radiation-caused physical compaction and low tendency to solarization, comprising
   at least 65% by weight of PbO,
   0 to 5000 ppm of $Sb_2O_3$
   0 to 500 ppm of $TiO_2$
   0 to 100 ppm of CuO
   0 to 1000 ppm of F,
wherein
$\Sigma(As_2O_3, As_2O_5, Sb_2O_3, F) \geq 20$ ppm and having a ratio of As(III)/As(V) of at least 0.5.

2. A glass with a low tendency to radiation-caused physical compaction and low tendency to solarization, comprising
   18 to 31% by weight of $SiO_2$,
   0 to 7% by weight of $Na_2O_3$,
   0 to 7% by weight of $K_2O$,
   65 to 84% by weight of PbO,
   0.001 to 1% by weight of $As_2O_3+As_2O_5$,
   with a content of
   0 to 5000 ppm of $Sb_2O_3$
   0 to 500 ppm of $TiO_2$
   0 to 100 ppm of CuO
   0 to 1000 ppm of F,
wherein
$\Sigma(As_2O_3, As_2O_5, Sb_2O_3, F) \geq 20$ ppm and having a ratio of As(III)/As(V) of at least 0.5.

3. The glass according to claim 2, which is obtainable by the adjustment of the ratio As(III)/As(V) by 0 to 5000 ppm of carbonaceous reducing agents, wherein $\Sigma(Sb_2O_3+5*F+$ carbonaceous reducing agent$+50*Cu+10*TiO_2) \geq 50$ ppm.

4. The glass according to claim 2, wherein the content

| of $SiO_2$ is | 19 to 30% by weight |
|---|---|
| that of $Na_2O$ is | 0 to 5% by weight |
| that of $K_2O$ is | 0 to 5% by weight |
| that of PbO is | 66 to 83% by weight |
| that of $Sb_2O_3$ is | 0 to 3000 ppm |
| that of $TiO_2$ is | 0 to 200 ppm, | wherein
$\Sigma(As_2O_3, Sb_2O_3, F) \geq 50$ ppm and
$\Sigma(Sb_2O_3+5*F+$carbonaceous reducing agent$+50*Cu+ 10*TiO_2) \geq 100$ ppm.

5. The glass according to claim 4, wherein the $\Sigma(As_2O_3, Sb_2O_3, F)$ is 50 to 7,000 ppm.

6. The glass according to claim 2, wherein the $\Sigma(Sb_2O_3+ 5*F+$carbonaceous reducing agent$+50*Cu+10*TiO_2)$ is 50 to 10,000 ppm.

7. The glass according to claim 2, wherein the amount of $Sb_2O_3$ is lower or equal to 1000 ppm, that of titan oxide is lower or equal to 400 ppm and/or that of copper oxide is lower or equal to 80 ppm.

8. The glass according to claim 2, which is a light flint glass and that the content

| | |
|---|---|
| of SiO$_2$ is | 21 to 28% by weight |
| that of Na$_2$O is | 0 to 3% by weight |
| that of K$_2$O is | 0 to 3% by weight |
| that of PbO is | 68 to 81% by weight |
| that of Sb$_2$O$_3$ is | 0 to 3000 ppm |
| that of TiO$_2$ is | 0 to 200 ppm, | wherein

Σ(As$_2$O$_3$, Sb$_2$O$_3$, F)≧50 ppm and

Σ(Sb$_2$O$_3$+5*F+carbonaceous reducing agent+50*Cu+10*TiO$_2$)≧100 ppm.

9. The glass according to claim 2, which is a light flint glass and that the content

| | |
|---|---|
| of SiO$_2$ is | 22 to 27% by weight |
| that of Na$_2$O is | 0.1 to 2% by weight |
| that of K$_2$O is | 0.1 to 2% by weight |
| that of PbO is | 71 to 78% by weight |
| that of Sb$_2$O$_3$ is | 0 to 3000 ppm |
| that of TiO$_2$ is | 0 to 200 ppm, | wherein

Σ(As$_2$O$_3$, Sb$_2$O$_3$, F)≧50 ppm and

Σ(Sb$_2$O$_3$+5*F+carbonaceous reducing agent+50*Cu+10*TiO$_2$)≧100 ppm.

10. The glass according to claim 2, which contains oxides of Fe, Cr, Co, Ni, Mn, Ag and/or V in an amount of lower or equal to 1,000 ppm each.

11. A process for producing a glass with a low tendency to radiation-caused physical compaction and low tendency to solarization according to claim 1 comprising forming a melt of Sb$_2$O$_3$ is 0 to 5,000 ppm, that of TiO$_2$ is 0 to 500 ppm, that of CuO is 0 to 100 ppm, that of F is 0 to 1,000 ppm and adding 0 to 5,000 ppm of a carbonaceous reducing agent, wherein Σ(As$_2$O$_3$, Sb$_2$O$_3$, F)≧20 ppm and Σ(Sb$_2$O$_3$+5*F+carbonaceous reducing agent+50*Cu+10*TiO$_2$)≧50 ppm.

12. A process for producing a glass with a low tendency to radiation-caused physical compaction and low tendency to solarization according to claim 2 comprising forming a melt of 18 to 31% by weight of SiO$_2$, 0 to 7% by weight of Na$_2$O$_3$, 0 to 7% by weight of K$_2$O, 65 to 84% by weight of PbO, 0.001 to 1% by weight of As$_2$O$_3$, wherein the content of Sb$_2$O$_3$ is 0 to 5000 ppm, that of TiO$_2$ is 0 to 500 ppm, that of CuO is 0 to 100 ppm, that of F is 0 to 1000 ppm and adding 0 to 5000 ppm of carbonaceous reducing agent, wherein Σ(As$_2$O$_3$, Sb$_2$O$_3$, F)≧20 ppm and Σ(Sb$_2$O$_3$+5*F+carbonaceous reducing agent+50*Cu+10*TiO$_2$)≧50 ppm.

13. A lens, prism, fibre-optic rod, optical window, optical component for photolithography, stepper, excimer laser, wafer, computer chip, integrated circuit, electronic apparatus, or a telecommunication or information transmission apparatus comprising a glass according to claim 2.

14. An assembly part or component, polarizing beam splitter, a colour splitter, a digital projection apparatus, a polarization controlled colour management system or reflective LCD comprising a glass according to claim 2.

15. The glass according to claim 1, wherein the ratio As(III)/As(V) is at least 0.7.

16. The glass according to claim 2, wherein the ratio As(III)/As(V) is at least 0.7.

17. The glass according to claim 1, wherein the ratio As(III)/As(V) is about 0.75.

18. The glass according to claim 2, wherein the ratio As(III)/As(V) is about 0.75.

19. The glass according to claim 1, which contains 0.001 to 1% by weight of As$_2$O$_3$+As$_2$O$_5$.

20. The glass according to claim 1, which contains 65 to 84% by weight of PbO.

* * * * *